United States Patent
Gorder et al.

(10) Patent No.: US 7,307,659 B2
(45) Date of Patent: Dec. 11, 2007

(54) METHOD OF FIXED PATTERN NOISE-REDUCTION AND SYSTEM THEREOF

(75) Inventors: Michael Gorder, Phoenix, AZ (US); Marilyn Sutanu, Pasadena, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 880 days.

(21) Appl. No.: 10/319,866

(22) Filed: Dec. 13, 2002

(65) Prior Publication Data

US 2004/0113046 A1    Jun. 17, 2004

(51) Int. Cl.
*H04N 5/217* (2006.01)

(52) U.S. Cl. .............. 348/241; 348/247; 348/231.6
(58) Field of Classification Search .............. 348/241, 348/231.3, 302–308; 250/208.1
See application file for complete search history.

(56) References Cited

U.S. PATENT DOCUMENTS

| 5,594,813 | A  | * | 1/1997  | Fandrianto et al. ......... 382/236 |
| 6,473,124 | B1 | * | 10/2002 | Panicacci et al. ........... 348/241 |
| 6,654,054 | B1 | * | 11/2003 | Embler ...................... 348/241 |
| 7,042,507 | B2 | * | 5/2006  | Sato et al. ............. 348/333.11 |
| 2002/0003581 | A1 | * | 1/2002 | Sato et al. ............. 348/333.11 |

\* cited by examiner

*Primary Examiner*—Lin Ye
*Assistant Examiner*—Gevell Selby

(57) ABSTRACT

An array of photosensitive sensors each has a storage element to store a pixel value. A repeating fixed pattern noise correction module may be coupled to the photosensitive sensors to correct a repeating fixed noise pattern associated with the stored pixel values. In addition, a non-repeating fixed pattern noise hardware correction module may be coupled to the image sensor to correct a non-repeating fixed pattern noise associated with the pixel values stored in the plurality of elements. In a specific embodiment, one or both of the repeating fixed pattern noise correction module and the non-repeating fixed pattern noise hardware correction module are integrated onto a common substrate with the photosensitive sensors, and can comprise tables to identify specific fixed pattern noise locations.

31 Claims, 3 Drawing Sheets

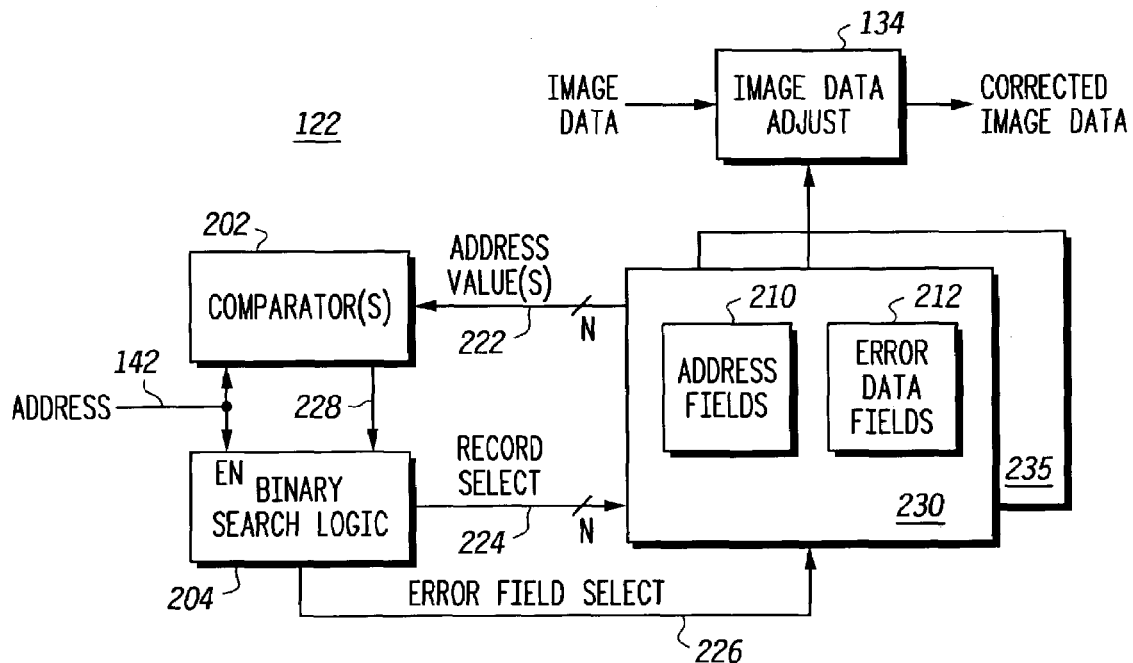
*FIG.2*
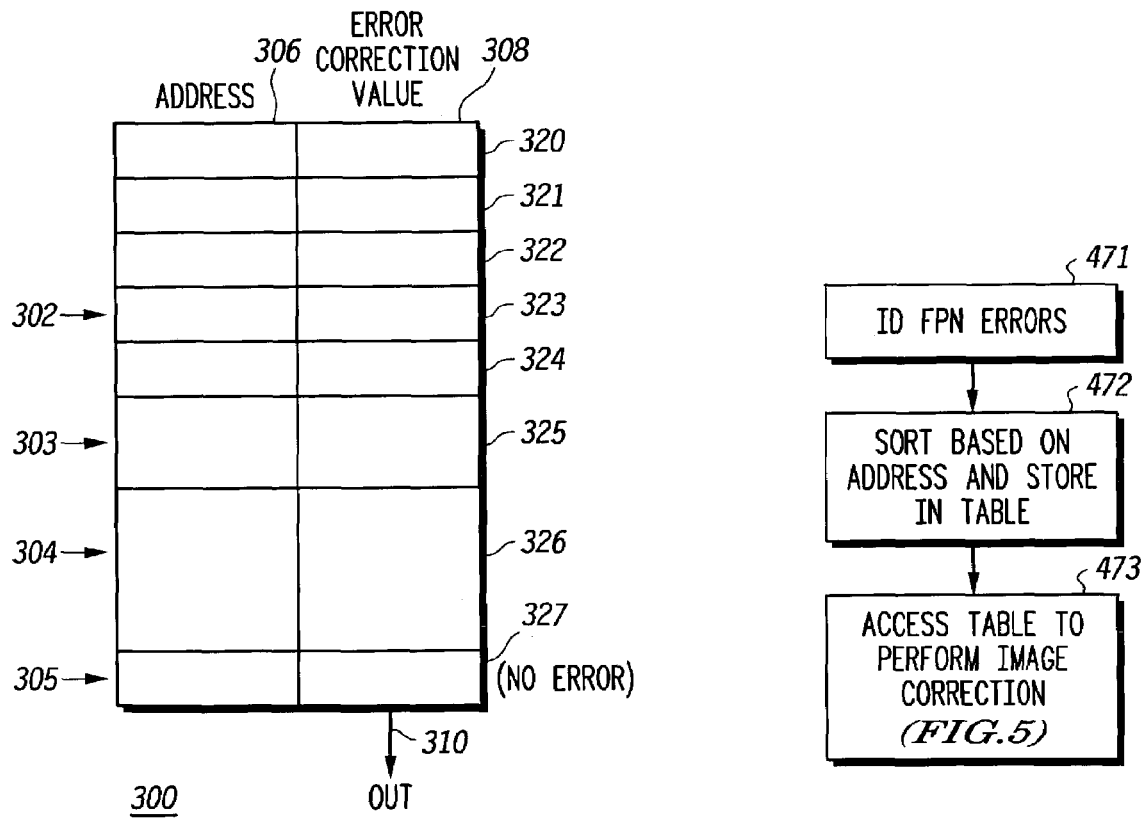
*FIG.3*   *FIG.4*

METHOD OF FIXED PATTERN NOISE-REDUCTION AND SYSTEM THEREOF

FIELD OF THE DISCLOSURE

The present invention relates generally to photo sensitive sensors, and more specifically to reducing fixed pattern noise associated with photo sensitive arrays.

BACKGROUND

The use of photo sensitive sensors, such as image sensors, in modern digital cameras and video recorders is well known. Generally, an image sensor is comprised of an array of individual sensors arranged in a series of columns, each column having a plurality of individual sensors that themselves are row elements. Each of the individual sensors has a storage element to maintain a value representing the image detected by that sensor. Typically the storage element will be one of either a capacitive element which stores a charge representing the image value, or memory to store a digital representation of a charge representing the image value.

The term column is used herein as a general term referring to the minimum repeated structure in one dimension of a sensor array, with the other dimension being the row. For example, it is common for image arrays to have a repeated column structure resulting in the image arrays being manufactured in a modular fashion. Image arrays manufactured in a modular manner are designed by duplicating a smaller design. For example, a manufacturer may design a specific image array module to have sixty-four (64) columns. If a larger array is desired, such as an array with five hundred and twelve columns (512) the 64 column design module would be repeated eight times. It is well known that when a modular technique is used, it is common for specific elements within the base design, e.g., the 64-column design module, to have errors which are repeated within each design module duplication. This results in a repeating error in a modular fashion across a larger array. For example, it would be possible for an error to occur in the second column of each base design module resulting in a repeating error every 64 columns, e.g. at column two of the reference design module. This repetition of errors is referred to as repeating Fixed Pattern Noise (FPN) within the photosensitive array. In other words, because these errors are "Fixed" with respect to a particular column or pixel within a column, they are predictable and can therefore be predictably corrected, while the "Noise" is with respect to the system, and reduces the quality of the image as a whole. It will be appreciated while the minimum repeated structure herein is assumed to be a column, that sensors can be made that would have the minimum repeated structure being a row. For purposes herein, the term column is used throughout to refer to the minimum repeated structure in one dimension of a sensor array whether a row or a column.

Manufacturers have compensated for the repeating fixed pattern noise errors in a number of manners. One solution used by manufacturers has been to provide a fixed pattern noise error register for each column in an array whereby the register associated with the specific column would have a stored error correction value to correct the noise associated with that column. It should be noted that typically the noise associated with the column would be applied to each storage element in the entire column. While effective, the design costs of implementing a storage location for each column in a photosensitive array is large, thereby resulting in increased design cost.

An alternative to correct repeating fixed pattern noise has been to provide a smaller number of registers associated with the modular size of the photosensitive array which is used in a repeating fashion. For example, where the base reference design for the photosensitive array is 64 columns, only 64 register values would need to be used. While this provides improved efficiency, it still requires more memory storage capability than is generally required by a specific design.

In addition to the repeating fixed pattern noise errors, non-repeating, or random, fixed pattern noise errors also can occur in specific columns. A non-repeating fixed pattern noise error refers to those errors that do not repeat in a modular fashion across the array, but are fixed with respect to their location within the array of a specific sensor. Typically, such errors are the result of unique manufacturing defects or flaws at a specific point of a device being manufactured. Typically such non-repeating fixed pattern noise errors have been corrected by of specific software applications, thereby increasing the complexity of final application software support.

It should now be apparent that an improved method and system of fixed pattern noise reduction would be useful.

BRIEF DESCRIPTION OF THE DRAWINGS

FIG. 2 illustrates in block diagram form, a specific implementation of a fixed pattern correction module of the present disclosure;

FIG. 3 illustrates a representation of a fixed pattern correction table used in accordance with a specific embodiment of the present disclosure;

FIG. 4 illustrates, in flow diagram form, a method in accordance with the specific embodiment to the present disclosure.

DETAILED DESCRIPTION OF THE FIGURES

One embodiment of the present disclosure discloses an array of photosensitive sensors each member of the array having a storage element to store a pixel value. A repeating fixed pattern noise correction module is coupled to the photosensitive sensors to correct a repeating fixed noise pattern associated with the stored pixel values. In addition, a non-repeating, e.g. random, fixed pattern noise correction module is operably coupled to the image sensor to correct a non-repeating fixed pattern noise associated with the pixel values stored in the plurality of elements. In a specific embodiment, one or both of the repeating fixed pattern noise correction module and the non-repeating fixed pattern noise correction module are integrated onto a common substrate with the photosensitive sensors.

In another embodiment, the fixed pattern noise correction module and the non-repeating fixed pattern noise correction module are implemented using tables containing specific address locations identifying those columns, or portions of the array, that need to have specific pattern noise correction.

For a specific address identified in the table as having fixed pattern noise correction error, the error value is also stored in the table so that the error can be corrected. By implementing a fixed pattern noise correction module having both repeating and non-repeating fixed pattern noise correction capabilities, along with the use of a table, efficient memory usage is obtained while maintaining a small size of the device. In addition, the ability to implement the fixed pattern noise correction onto a substrate in common with the photosensitive sensors is also advantageous.

Figure 1:
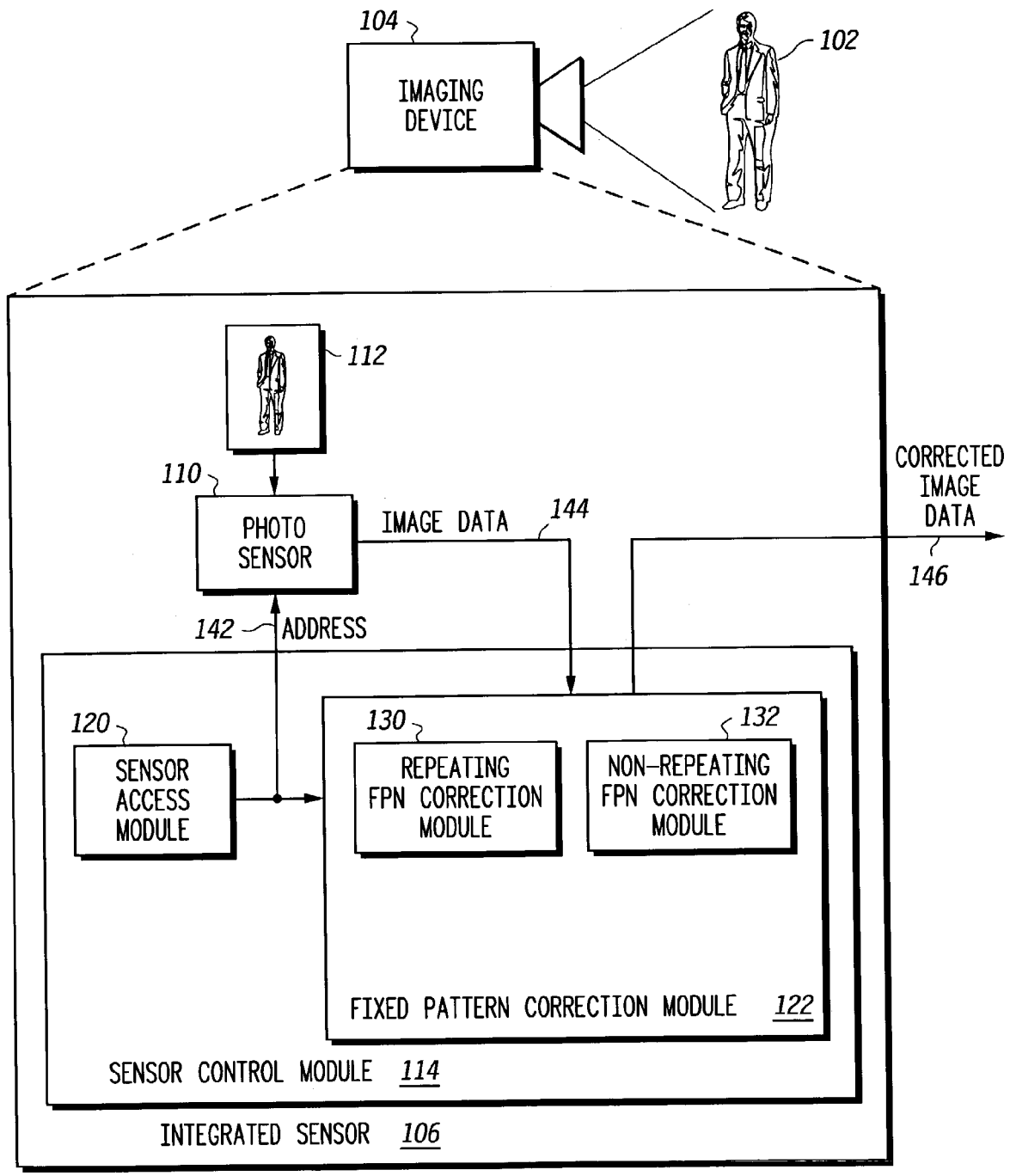
FIG. 1 illustrates a block diagram in accordance with a specific embodiment of the disclosure for reducing fixed pattern noise errors.

FIG. 1 illustrates a system in accordance with a specific embodiment of the present disclosure. Specifically, FIG. 1 illustrates an image of a target 102 being captured by an imaging device 104. The imaging device 104 will generally be a digital video camera, or a digital still camera such as are readily available for consumer and industrial purposes. The imaging device 104 includes an integrated sensor 106 that includes an image sensor 110 and a sensor control module 114. In one embodiment of the disclosure, the photo sensor 110 and at least a portion of the sensor control module 114 are integrated onto a common substrate. In operation, a representation of the target 102 is provided to the photo sensor 110. Image representation is illustrated by element 112 in FIG. 1. In response to receiving a representation of the image, values are stored within a pixel array of sensor 110 and are accessed by address 142 from sensor control module 114 to provide image data at interconnect node 144. The interconnect node 144 provides values representing stored image data from the image sensor 110 to the sensor control module 114 for correction as needed. In accordance with the present disclosure, the corrected image data provided at interconnect node 146 will be compensated for both repeating fixed pattern noise errors and non-repeating fixed pattern noise errors, if needed.

By correcting the fixed pattern noise errors captured within the image sensor 110, a corrected image data can provide a more accurate representation of the target image 102. Note that the corrected image data will match the image data if no errors exist. While the imaging device 104 is represented as a digital camera or digital video camera, it will be further appreciated that other photosensitive devices could be used. For example, devices that detect non-visible infrared or other photosensitive emissions could also be implemented in accordance with the specific embodiment of the present disclosure.

The sensor control module 114 further comprises a sensor access module 120 and a fixed pattern correction module 122. The sensor access module 120 is coupled to the fixed pattern correction module 122 as well as to the image sensor 110 to access and correct the image data.

In operation, the sensor access control module 120 generates addresses to retrieve stored pixel information from the image sensor 110. Generally, the addresses will include a column indicator and/or a row indicator associated with a portion of the sensor array of the image sensor. This address value is provided to the image sensor as well as to the fixed pattern correction module 122. The image sensor 110 provides image data to interconnect node 144 in response to receiving the address at interconnect node 142. The fixed pattern correction module 122 receives the address from sensor access module 120 and based upon at least a portion of the received address will determine whether or not the sensor location being accessed has a fixed pattern noise error to be corrected.

If a fixed pattern noise error is determined to be associated with the current address, the image data received over interconnect node 144 will be corrected and provided as corrected image data at node 146. If it is determined that no fixed pattern noise error is associated with the image data received over interconnect node 144, the data is provided to the corrected image data output at output node 146 without correction.

It will be appreciated, that the address being monitored by the fixed pattern correction module 122 may or may not be the entire address. For example, the fixed pattern correction module could monitor both the row and column information provided by the sensor access module 120, and may correct fixed pattern noise errors on a storage element by storage element basis. However, in a typical application, the fixed pattern correction module 122 will monitor only a portion of the address space provided by the access module 120. For example, it is typical for fixed pattern error to be the same for all elements of a column. In this situation, it would only be necessary for the fixed pattern correction module 122 to monitor the column portion of the address provided from sensor access module 120. When determined that a fixed pattern noise error is associated with the specific column, all elements within that column would be corrected for the fixed pattern noise or the error associated with the column would be accessed to correct the current sensor element error. For purpose of discussion, it is assumed herein that the columns of a specific array are the only addresses being monitored.

The fixed pattern correction module 122 further includes a repeating fixed pattern noise correction module 130 and a non-repeating fixed pattern noise correction module 132. In one embodiment of the present disclosure, one or both of modules 130 and 132 are hardware modules integrated onto a common substrate with the photo sensor 110. In operation, the repeating fixed pattern noise correction hardware module 130 will monitor the address received from sensor access module 120 to determine whether or not a specific column has a repeating fixed pattern noise error associated with it. If so, the repeating fixed pattern noise correction module 130 would remove the noise form each element within the column having the error. In a similar manner, the non-repeating fixed pattern noise correction module would monitor each address received from the sensor access module 120 to determine if a column currently being accessed has a non-repeating fixed pattern noise error associated with it. If a non-repeating fixed pattern noise error is determined to exist, it too would be removed before being provided to the corrected image data at node 146. Note that for any given column, one or both of a repeating and non-repeating fixed pattern noise error may exist, and may be compensated for according to one embodiment of the present disclosure.

In a specific embodiment of the present disclosure, the image sensor 100 is formed using CMOS (Complementary Metal Oxide Semiconductor) technology on a substrate in common with at least one of the repeating fixed pattern noise correction module 130 and the non-repeating fixed pattern noise correction module 132. In a preferred embodiment, the sensor control module 114 in its entirety and the image sensor 100 would be formed on a common substrate. A specific implementation of incorporating the sensor control module 114 is illustrated with respect to FIG. 2.

FIG. 2 illustrates, in block diagram form, a more detailed implementation of an embodiment of the fixed pattern correction module 122. More specifically, the fixed pattern correction module 122 comprises comparators 202, binary search logic 204, repeating fixed pattern noise table 230, non-repeating fixed pattern noise table 232, and image data adjust module 234. Operation of the control module 114 illustrated in FIG. 2 will be discussed with reference to the repeating fixed pattern noise table 230. It will be appreciated that similar techniques can be used along with the non-repeating fixed pattern noise table 232.

The comparators 202 and binary search logic 204 are coupled to interconnect node 142 to receive the address generated by the sensor access module 120. The binary search logic module 204 further provides one or more record select signals over interconnect node 224 to the repeating fixed pattern noise table 230. In addition, the binary search logic 204 provides an error field select indicator over interconnect node 226 to the repeating fixed pattern noise table 230. The repeating fixed pattern noise table 230 is coupled to comparator 202 by interconnect node 222. In addition, the repeating fixed pattern noise table 230 is coupled to image data adjust module 234.

It will be appreciated, that the comparators 202 and binary search logic 204 can also be coupled to the non-repeating fixed pattern noise table 232 in a similar manner, or that different comparators and binary search logic analogous to elements 202 and 204 could exist to access the non-repeating error table 232. However, for purposes of discussion only the repeating fixed pattern noise table 230 and its relationship with elements 202, 204 and 134 will be discussed.

In operation, an address is received over interconnect node 142 at the comparators 202 and binary search logic 204. The received address represents an address or a portion of an address of the sensor array stored with the image sensor 110. In response to receiving an address over interconnect node 142, the binary search logic 204 will begin a search of the address field 210 of the repeating fixed pattern noise table 230 to determine whether or not the table 230 indicates a fixed pattern noise error is associated with that specific address. Because a repeating fixed pattern noise error occurs in a modular fashion within an array that the binary search logic would only need to monitor a portion of the address being received over interconnect node 142. For example, if the sensor array had 512 columns, and a 64-column base reference design was used to implement the 512-column total array, only 6 bits of the column address would need to be monitored to determine whether or not one of the repeating 64 columns has a fixed pattern error associated with it. While a binary search logic 204 is specifically illustrated and discussed with respect to FIG. 2, it will be appreciated that other search modules other than a binary search logic module could be used.

In response to receiving the address at interconnect node 142, the binary search logic module 204 will provide a specific record select indicator over interconnect node 224 to the repeating fixed pattern noise table 230. Interconnect node 224 can represent a register value used to access a specific record within the table 230, or it can represent one or more select lines, whereby each select line activates a specific record with the table 230. In response to a specific record being identified, the repeating fixed pattern noise table 230 would access that record, and would provide an address value to interconnect 222.

It will be appreciated that the interconnect 222 will typically be a bus providing the same number of address bits as are being monitored by the binary search logic 204. For example, in the case of a fixed pattern noise lookup, where 6 bits of the address are being monitored, a 6 bit value would be provided over interconnect node 222, in effect operating as a bus. Likewise, it will be appreciated that where multiple address records can be accessed at a common time, or within a single clock cycle, that there may be a plurality of buses associated with the interconnect 222.

Upon receiving an address value at the comparator 202, a compare is made to the address received over interconnect node 142 to determine whether the currently accessed record references the address accessed at the image sensor 110. If so, an asserted match indicator will be sent from the comparator 202 to be binary search logic 204 over interconnect node 228 to notify the binary search logic 204 that a match has occurred and thereby an error correction is needed.

When an error correction is needed, the binary search logic 204 provides' an error field select signal over interconnect 226 to the repeating fixed pattern noise table 230. In response to receiving the error field select signal the repeating fixed pattern noise table will provide error correction data from the appropriate field of the error data fields 212 to the image data adjust module 234, which in turn will adjust the image data accessed from the image sensor 110 to provide a corrected image data. The image data received at the image data adjust module 234 may be received in either an analog or a digital format and subsequently adjusted to provide an analog or digital corrected image data. Where an analog image is received, any digital values stored within the repeating fixed pattern noise table 230 would be converted from a digital value to an analog value allowing the charge associated with the image data to be modified appropriately.

In a specific implementation, the error correction of the image data occurs in real-time relative to the addresses being received at interconnect node 142. In other words, the search performed by the binary search logic 204 occurs within the time an address is present.

In a similar manner as described with respect to the repeating fixed pattern noise table 230, non-repeating fixed pattern errors can also be determined using the non-repeating fixed pattern table 232. In one embodiment, two sets of comparators and two sets of binary search logic 204 will work concurrently to identify repeating and non-repeating fixed pattern noise errors stored within the tables 230 and 232. In other embodiments, typically when high speed clocks are available, the comparators 202 and binary search logic 204 can operate on both the repeating and non-repeating tables 230 and 232, respectively, to determine the error corrections to be applied.

Illustrative operation of the binary search logic and the layout of the fixed pattern noise tables 230 and 232 will be further described with respect to FIG. 3. Specifically, FIG. 3 illustrates a specific embodiment of a fixed pattern noise table such as may be associated with FPN repeating table 230 or non-repeating FPN table 232. The table 300 of FIG. 3 illustrates a table having 8 records (320 through 327). Each of the records includes an address field 306, such as associated with address field 210 of FIG. 2 and an error offset data 308, such as associated with error data fields 212. It will be appreciated that the address field 306 stores an address associated with the image sensor array 110 that contains a fixed pattern noise error. The offset field 308 of the table 300 includes a error correction value by which elements associated with a column having an error are to be offset to correct for the error. Indicator 302 in FIG. 3 indicates where the first search of the binary search logic 204 is performed within the table 300 of FIG. 3. Specifically, the element 323, where the first search occurs, is the midpoint element of the table 300. Upon being selected, the address stored at field 306 of record 323 would be provided to the comparator 202 to determine whether or not the stored address matches the address received by the access module 120 of FIG. 1.

If the address matches, an indicator is provided over interconnect node 228 to indicate that a match occurred, and subsequently an error field select signal would be asserted on interconnect node 226. If the comparator 202 indicates that the value stored at record 323 is smaller than the address value received at interconnect node 142, an indicator at interconnect node 228 would be asserted indicating that the address, if present in the table 300, is be stored at a higher address. Note the use of the binary search logic 204 requires the address values stored within table 300 to be stored in either ascending or descending order. For purpose of discussion it will be assumed that the address values are stored in table 300 in ascending order.

Upon receiving the indicator that the address value at element 323 is too small, the binary search logic would then increment the search location to search location 303 indicated in FIG. 3. In a similar manner, the comparator 202 will receive the address value associated with record 325 and determine whether the address value stored is higher, lower, or equal to the address value received at interconnect node 142. It will be appreciated that if the comparator indicates the value is too small, the next higher location 304, which is element 326, will be searched. However, if it is indicated that the value is too large, the next lower element would be searched. In this manner a binary search can be implemented in an efficient manner. The use of a binary search results in location 305 being an extra element that would not be searched with respect to an address. Therefore element 327 can be used to maintain an offset value when no error is found. This offset value could be used to indicate no error has been found, or could actually provide an offset to be applied generally.

FIG. 4 illustrates, in flow diagram form, a method in accordance with the present disclosure. At step 471, all fixed pattern noise errors associated with a photosensitive array are identified. Typically, this is accomplished deterministically in a testing environment. Once determined, the fixed pattern noise errors will be categorized as either repeating fixed pattern noise errors or non-repeating fixed pattern noise errors.

At step 472, the errors identified at step 471 are sorted by address and stored in an appropriate table. For example, the errors identified as repeating fixed pattern noise errors will be sorted by address such that the errors can be stored by ascending addresses in the repeating fixed pattern noise error table. Likewise, the non-repeating fixed pattern noise errors will be sorted by address such that their addresses are stored in ascending order and stored within the non-repeating fixed pattern noise error table. As previously mentioned, by storing the values in an ascending order, or a descending order, a binary search can be efficiently performed.

At step 473, each of the repeating and non-repeating fixed pattern noise tables are accessed to determine whether or not image correction is to be performed at specific address locations of a sensor array, and to perform the indicated image correction. A specific implementation of the step 473 is illustrated in FIG. 5 that illustrates a binary search access of tables to perform image correction.

Figure 5:
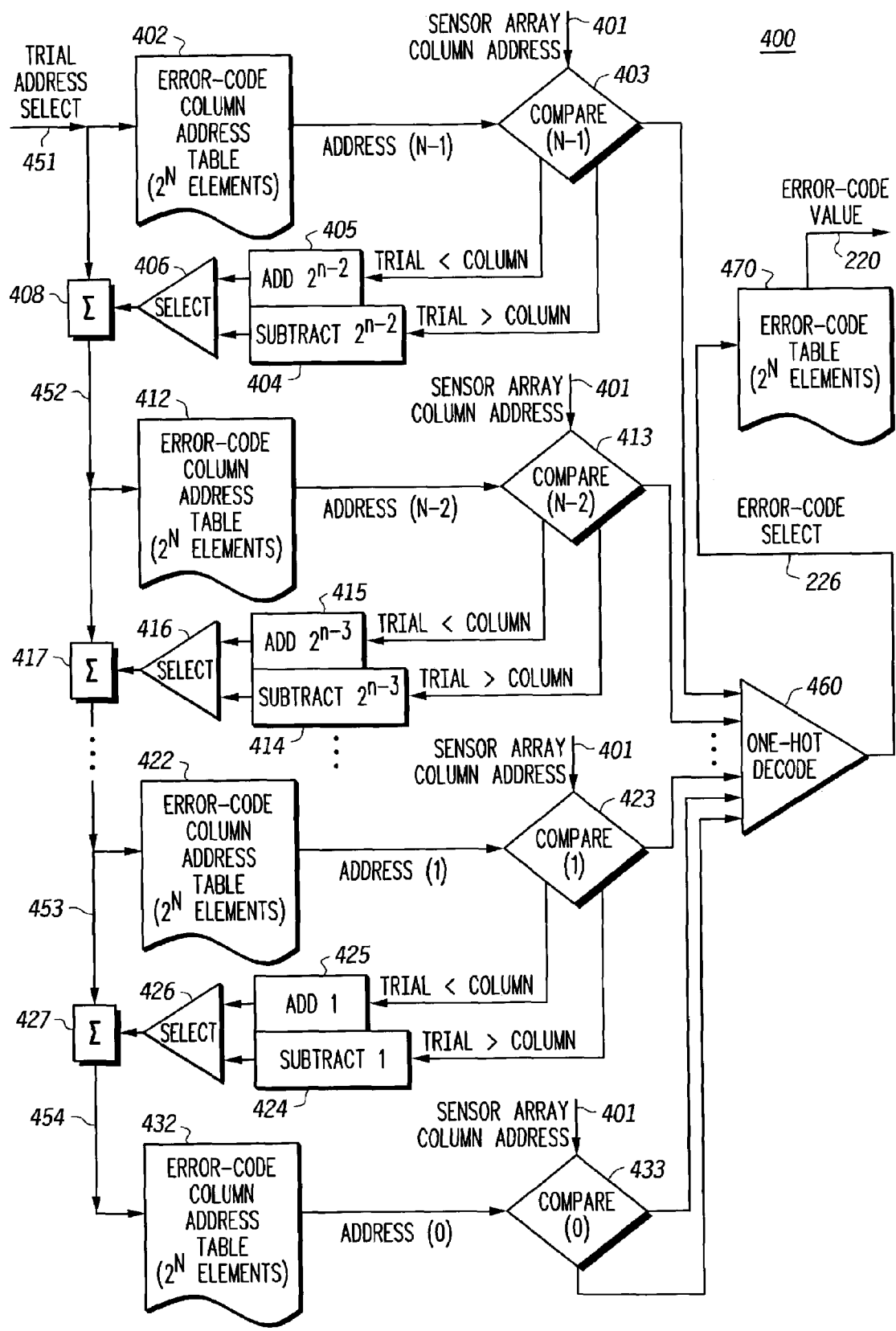
FIG. 5 illustrates, in flow diagram form, a method in accordance with a specific embodiment to the present invention for detecting whether a specific column given array has a fixed pattern noise error to be corrected.

FIG. 5 illustrates, in flow diagram form, a method in accordance with the present disclosure. Specifically, the implementation illustrated in FIG. 5 implements a binary search algorithm using a ripple based design. The ripple design is such that the binary search can occur within a single clock cycle; however, each of the stages within the ripple design is dependent upon the previous stage being completed.

A first stage of the flow diagram of FIG. 5 includes elements 402, 403, 404, 405, 406, and 407. The first stage receives from a binary search algorithm a trial address referred to as an N−1 order access. With reference to the table of FIG. 3, the N−1 order address would be the location 302, associated with address 323. This access is referred to the N−1 order access, because the table element being accessed is the table location stored at 2**(N−1). In response to receiving this address, a first element with the table 402 is accessed and provided to the compare node 403. At the compare node 403, the selected trial address is compared to the sensor array column address 401. If a match is found, an asserted indicator is provided to the one-hot decode 460. Otherwise, an indicator of whether the trial access is too high or too low is provided to subtract module 404 or the addition module 405, respectively.

The subtract and add modules 404 and 405 are used to modify the originally received trial address 451 to increment or decrement the address accessing the table 402 to test another stored address. For example, referring to FIG. 3, where the second access 303 occurred at element 325 the compare node 403 determined that the trial address was smaller than the actual column address and the address was incremented by 2. Referring back to FIG. 5, this increment value of 2 would have been added to the original trial address 451 through addition element 405, resulting in the table 412 being accessed at a different location and providing a different number to a second compare node 413. The tables 402, 412, 422, and 432 are the identical table, and have been referred to with different numbers for purposes of discussion with respect to FIG. 5.

Three additional stages of the ripple design of FIG. 5 are illustrated whereby each stage is affected by the stage before determining whether or not to increment or decrement the next binary offset and to determine whether or not a specific address value is stored within the table. Once an address is determined to exist within a record of the table, the one-hot decode element 460 will provide an asserted error code select indicator that is used to access the error code table to provide an error code value to be used to offset the specific values being accessed from the image array sensor. A hardware implementation of the method of FIG. 5 would be capable of searching the table in one clock cycle. For example, where the address is updated with each pixel clock, the table would be searched prior to the next address being received. A hardware design implementing the flow of FIG. 5 would be useful where a high speed decode is needed without the availability of a high speed clock. It will be further appreciated, that a single stage implementation could be implemented using a register set whereby the register set is controlled by binary search logic having a high speed clock available whereby the register set would be modified during each search cycle to indicate the current address being accessed. This hardware embodiment would be capable of searching the table in $\log_2(M)$ clock cycles, where M is equal to the number of table records.

Although unique cases may have other properties, empirical data has suggested that a table size of SQRT(M) (the square root of M), where M is the address range of the sensor unit that a specific FPN table is applied to, is sufficient for purposes of correcting fixed pattern noise errors associated with specific sensor array address ranges. So, for an array using a base array having 64 columns, a table would generally need to have no more than 8 records to correct repeating fixed pattern noise errors, while for random, non-repeating, fixed pattern noise errors, a table size of no larger than 32 elements would generally be needed for a full sensor array having 1024 columns. Therefore, it is readily apparent that the memory and die area required by a sparse table FPN solution for even relatively small sensors (e.g.

<256 columns) may be significantly less than previous solutions requiring a fully populated table.

It will be appreciated that the present disclosure provides an improved system and method for correcting fixed pattern noise errors associated with photo sensor arrays. Specifically, the present disclosure provides a method of correcting both repeating fixed pattern noise errors and non-repeating fixed pattern noise errors on a common substrate that utilizes a small amount of storage space. It will be appreciated, that other embodiments of the present application, other than those illustrated can be implemented. For example, it will be appreciated that other tree-structured search algorithms/engines, besides the binary search described, having log2 (M) search complexity can be used, where M is the number of elements being searched. As such, the above disclosed subject matter is to be considered illustrative, and not restrictive, and the appended claims are intended to cover all such modifications, enhancements, and other embodiments that fall within the true spirit and scope of the present invention. Thus to the maximum extent allowed by law, the scope of the present invention is to be determined by the broadest permissible interpretation of the following claims and their equivalents, and shall not be restricted or limited by the foregoing detailed description.

What is claimed is:

1. An imaging device comprising:
   an array of photosensitive sensors having N columns, each sensor of the array of photosensitive sensors having a storage element to store a pixel value;
   a repeating Fixed Pattern Noise (FPN) correction module operably coupled to the array of photosensitive sensors to correct a repeating fixed noise pattern associated with pixel values to be stored in the array of photosensitive sensors, the FPN correction module comprising a first table of M records, where M is less than N and each record of the M records is programmable to correspond to one of the N columns; and
   a non-repeating FPN correction hardware module operably coupled to the array of photosensitive sensors to correct a non-repeating fixed noise pattern associated with the pixel values to be stored in the array of photosensitive sensors.

2. The imaging device of claim 1, wherein M is less than or equal to the square root of N.

3. The imaging device of claim 2, wherein the non-repeating FPN correction hardware module is integrated onto a common substrate with the array of photosensitive sensors.

4. The imaging device of claim 3, wherein the repeating FPN correction module is integrated onto a common substrate with the array of photosensitive sensors.

5. The imaging device of claim 2, wherein, each record of the first table comprises a first storage location to store an address identifying a repeating error location, and a second storage location to store an error value identifying a repeating fixed noise pattern error associated with the repeating error location.

6. The device of claim 5, wherein the non-repeating FPN correction module comprises a second table to store a plurality of records, each record of the second table comprising a third storage location to store an address identifying a non-repeating error location, and a third storage location to store an error value identifying a non-repeating fixed noise pattern error associated with the non-repeating error location.

7. The device of claim 2, wherein the non-repeating FPN correction hardware module comprises a second table to store a plurality of records, each record of the second table comprising a first storage location to store an address identifying a non-repeating error location, and a second storage location to store an error value identifying a non-repeating fixed noise pattern error associated with the non-repeating error location.

8. The device of claim 2, further comprising a parsing module to parse a table identifying FPN error locations and values.

9. The device of claim 8, wherein the parsing module comprises binary search logic to parse the table.

10. The device of claim 2, wherein the photosensitive sensors comprise image sensors.

11. The device of claim 2, wherein each storage element stores a digital value.

12. The device of claim 2, wherein each storage element stores an analog value.

13. A system comprising:
   a repeating fixed pattern noise correction module associated with an array of photosensitive sensors having N columns, the repeating fixed pattern noise correction module comprising a table of M records, where M is less than N and each of the M records is programmable to correspond to one of the N columns; and
   a non-repeating fixed pattern noise correction module integrated onto a common substrate with the repeating fixed pattern noise correction module.

14. The system of claim 13, wherein M is less than or equal to the square root of N.

15. The system of claim 14 wherein each record of the table comprises a first storage location to store an address identifying an error location and a second storage location to store a fixed noise patter error value associated with the error location.

16. The system of claim 15, wherein the error location comprises a repeating error location.

17. The system of claim 15, wherein the error location comprises a non-repeating error location.

18. A system comprising:
   an array of photosensitive sensors having N columns; and
   a fixed pattern noise correction module operably coupled to the photosensitive sensor, the fixed pattern noise correction module further comprising an error table comprising a plurality of tables comprising M records further comprising an address field and an error value field, wherein M is less than N and each of the M records is programmable to correspond to one of the N columns.

19. The system of claim 18, wherein M is less than or equal to the square root of N.

20. The system of claim 19 wherein the fixed pattern noise correction module is to adjust pixel values for repeating fixed pattern noise.

21. The system of claim 20 wherein the fixed pattern noise correction module is to adjust pixel values for non-repeating fixed pattern noise.

22. The system of claim 19 wherein the fixed pattern noise correction module is to adjust pixel values for non-repeating fixed pattern noise.

23. The system of claim 19, wherein the fixed pattern noise correction module and the photosensitive sensor are integrated on a common substrate.

24. The system of claim 19, wherein the photosensitive sensor comprises a complementary metal oxide semiconductor photosensitive sensor.

25. A method comprising:
- receiving at an input node a first address location associated with a first pixel storage location; wherein the first address location identifies a first column comprising a first plurality of pixel storage locations and wherein the first column is a column of an array of pixel storage locations having N columns;
- receiving at the input node a second address location associated with a second pixel storage location, wherein the second address location identifies a second column comprising a second plurality of storage locations;
- determining if the first address location is stored in an address field of a fixed pattern noise error table prior to receiving the second address location; the fixed pattern noise table having M records and wherein M is less than N and each of the M records is programmable to correspond to one of the N columns; and
- sending corrected data at an output node in response to determining that the first address location is stored in the address field, the corrected data based on a record of the fixed pattern noise error table.

26. The method of claim 25, wherein M is less than or equal to the square root of N.

27. The method of claim 26, wherein the second address location is received at the input node one pixel clock cycle after receiving the first address location at the input node.

28. The method of claim 26, wherein the second address location is received at the input node within $\log_2(M)$ clock cycles after receiving the input of the first address location at the input node, where M is a number of records in the fixed pattern noise table.

29. A method comprising:
- receiving at an integrated device an address corresponding to a first portion of a pixel array having N columns;
- performing at the integrated device a binary search of an error table to determine if an error is associated with the first portion of the pixel array, the error table having M records, where M is less than N and each of the M records is programmable to correspond to one of the N columns; and
- sending corrected data at the integrated device in response to determining that an error is associated with the first portion of the pixel array, the corrected data based on a record of the error table.

30. The method of claim 29, wherein M is less than or equal to the square root of M.

31. The method of claim 30, wherein performing the binary search comprises performing $\log_2(M)$ searches, where M is the number of records associated with the error table.

* * * * *